United States Patent [19]

Unroe et al.

[11] Patent Number: 5,691,442
[45] Date of Patent: Nov. 25, 1997

[54] TRANSPARENT POLY(ARYLENE ETHER) COMPOSITIONS

[75] Inventors: Marilyn R. Unroe, Dayton; Rakesh K. Gupta, Beavercreek; Ram B. Sharma, Miamisburg; Neil C. Thiesing, Beavercreek, all of Ohio

[73] Assignee: The United States of America as represented by the Secretary of the Air Force, Washington, D.C.

[21] Appl. No.: 715,135

[22] Filed: Sep. 17, 1996

[51] Int. Cl.⁶ .................................................. C08G 8/02
[52] U.S. Cl. .......................... 528/125; 128/126; 128/151; 128/152; 128/153; 128/155; 128/219; 128/220
[58] Field of Search ..................................... 528/125, 126, 528/151, 152, 153, 155, 219, 220

[56] References Cited

U.S. PATENT DOCUMENTS

| | | | |
|---|---|---|---|
| 4,175,175 | 11/1979 | Johnson et al. | 528/125 |
| 5,268,444 | 12/1993 | Jensen et al. | 528/125 |
| 5,387,629 | 2/1995 | McGrath et al. | 524/190 |

*Primary Examiner*—James J. Seidleck
*Assistant Examiner*—Duc Truong
*Attorney, Agent, or Firm*—Charles E. Bricker; Thomas L. Kundert

[57] ABSTRACT

The transparency of poly(arylene ether) homopolymers and copolymers is improved by endcapping the polymer chain with an unsubstituted phenolic-based endcapping agent.

7 Claims, No Drawings

TRANSPARENT POLY(ARYLENE ETHER) COMPOSITIONS

RIGHTS OF THE GOVERNMENT

The invention described herein may be manufactured and used by or for the Government of the United States for all governmental purposes without the payment of any royalty.

BACKGROUND OF THE INVENTION

This invention relates to poly(arylene ether) compositions, and in particular, to a method for increasing the transparency of these compositions.

High performance engineering thermoplastics have become increasingly important in applications traditionally filled by metallic materials. Their use in the field of high strength, lightweight, composite resins has found many applications in the aerospace, automotive, electronic and related industries. These industrially important thermoplastics include polyesters, polyamides, polyimides, and poly (arylene ether)s (PAEs), such as the poly(arylene ether ketone)s (PEKs) and poly(arylene ether sulfone)s (PESs). The high glass transition temperatures ($T_g$) and/or melting temperatures ($T_m$) of these thermoplastics makes them ideal materials for use in environments where a part is exposed to high temperatures for prolonged periods of time.

Recent interest in increasing the service ceiling and thus the ultimate long term use temperatures of the transparent plastics which are used in the fabrication of aircraft canopies and windscreens has required the examination of a variety of organic polymeric materials. Current materials in the general chemical forms of acrylics and polycarbonates have limited use temperatures of 150°–200° F. and 325° F. respectively, temperatures which can only be maintained for a short time. While improvements to the state-of-the-art processing techniques of extrusion or injection molding may incrementally enhance the physical and thermal performance of these materials, the general chemical structure of the respective polymeric backbones of acrylics and polycarbonates will be limited to ultimate use temperatures at which the backbones will thermooxidatively degrade and/or the polymer will lose its mechanical integrity.

Poly(arylene ether)s have been reported as a class of polymers for various uses in engineering thermoplastic structural composite and electronic applications. More recently the reports on poly(arylene ether phosphine oxide)s ((PEPO)s) have documented moderate resistance to γ-radiation degradation and degradation by atomic oxygen in order that more stable materials may be produced for space and heat-resistant applications. The underlying utility of PEPO polymers as engineering thermoplastic materials has been their close resemblance in structure and persistence length of the repeat unit to commercially available poly (sulfone)s and poly(ether sulfone)s, poly(arylene ether ketone)s and poly(arylene ether ether ketone)s. The advantages of PEPO polymers over the state-of-the-art poly (arylene ether ketone) and poly(arylene ether ether ketone) polymers are: first, the enhanced thermal stability of the polymers and thus increased use temperature; and secondly, the noncrystallinity of the PEPO polymers which allows for ease of processing and increased toughness of the resultant fabricated specimen. The drawback of the PEPO homopolymers and copolymers for a transparent materials application such as an aircraft canopy has been the presence of solid occlusions which appear as artifacts of the processing after exposure to heat and/or pressure.

It is an object of the present invention to provide a method for increasing the transparency of arylene ether homopolymers and copolymers.

It is another object of the present invention to provide a method for increasing the transparency of PEPO homopolymers and copolymers.

Other objects and advantages of the present invention will be apparent to those skilled in the art.

SUMMARY OF THE INVENTION

In accordance with the present invention there is provided a method for increasing the transparency of poly(arylene ether) homopolymers and copolymers which comprises endcapping the polymer chain with an unsubstituted phenolic-based endcapping agent.

The general preparation of poly(arylene ethers) including the PEPO polymers involves a nucleophilic displacement reaction upon activated aromatic halide monomers with alkali metal phenate monomers or Friedel-Crafts reagents. The polymerization may be accomplished using polar aprotic solvents such as dimethylsulfoxide (DMSO), N,N-dimethylacetamide (DMAc), or N-methylpyrrolidinone (NMP) or the polymerization may be done under neat conditions.

The general reaction scheme for poly(arylene ether)s using alkali metal phenate monomers in DMAc or NMP is shown by the following reaction:

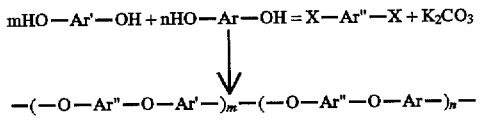

wherein Ar, Ar' and Ar" represent aromatic moieties, X represents a halide and m and n represent the proportions of the dihydric phenols.

The typical solution preparation of the polymer or copolymer composition is the generation of the metal phenate in situ using the specific diol monomer(s) and heating in the presence of potassium carbonate, in a 1–2.5 mol excess relative to the phenol-containing monomer(s). The aromatic dihalide monomer(s) is (are) added with the diol(s) and solvents. After removal of the water under an inert atmosphere, the reaction is heated at 160°–170° C. for a suitable period of time, typically 16–24 hours, the reaction mixture is quenched in water or aqueous alcoholic solvent, and the resultant homopolymer or copolymer is precipitated.

The same result is achieved by adding the alkali metal salt of the dihydric phenol in the solvent to the dihalobenzenoid compound either continuously, incrementally or all at once so as to achieve the polymerization reaction. Thus the reaction can readily be conducted in batch, semi-continuous, or continuous operation by the proper selection or adjustment of addition rate, reaction rate and temperature as is obvious to those skilled in the art from the present disclosure.

Removal of water is accomplished by employing a solvent mixture comprising an azeotrope former and a reaction solvent in a weight ratio of from about 10:1 to about 1:1, preferably from about 4:1 to about 3:1, removing water from the reaction mass as an azeotrope with the azeotrope former until substantially anhydrous conditions are attained, adjusting the ratio of azeotrope former to reaction solvent from about 1:1 to about 1:10, preferably from about 1:3 to about 1:4, by removing excess azeotrope former, and reacting the alkali metal double salt with the dihalobenzenoid compound in the liquid phase of the reaction solvent.

The method of the present invention comprises endcapping the poly(arylene ethers) with about 0.5–4 mol % monohydric phenolic endcapping agent based on the total dihydric phenolic moieties present.

The residuum Ar and/or Ar' of the dihydric phenol can be, for instance, a mononuclear phenylene group as results from hydroquinone and resorcinol, or it may be a di- or polynuclear residuum. Likewise it is possible that the residuum be substituted with other inert nuclear substituents such as halogen, alkyl, alkoxy and like inert substituents. As herein used the Ar and Ar' terms defined as being the "residuum of the dihydric phenol" of course refer to the residue of the dihydric phenol after the removal of the two aromatic hydroxyl groups.

From a practical standpoint, limitations on polymer molecular weights may be expected when the dihydric phenol or the alkali metal derivative thereof contain strong electron withdrawing groups. This may result in lower molecular weight polymers or impractically slow reaction rates. Hence, it is preferred that the dihydric phenol be a weakly acidic dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or the chlorinated derivatives containing one or two chlorines on each aromatic ring. While these halogenated bisphenolic alkanes are more acidic than the non-halogenated bisphenols and hence slower in reactivity in this process, they do impart valuable flame resistance to these polymers. Other materials also termed appropriately "bisphenols" are also highly valuable and preferred. These materials are the bisphenols of a symmetrical or unsymmetrical joining group, as for example, ether oxygen (—O—), sulfide (—S—), sulfone (—SO$_2$—), or hydrocarbon residue in which the two phenolic nuclei are joined to the same or different carbon atoms or the residue such as, for example, the bisphenol of acetophenone, the bisphenol of benzophenone, the bisphenol of vinyl cyclohexene, the bisphenol of alpha-pinene, and the like bisphenols where the hydroxyphenyl groups are bound to the same or different carbon atoms of an organic linking group.

Examples of specific dihydric polynuclear phenols include among others: 9,9-bis(4-hydroxyphenyl)fluorene, the bis-(hydroxylphenyl)alkanes such as 2,2-bis-(4-hydroxyphenyl)propane, 2,4'-dihydroxydiphenylmethane, bis-(2-hydroxyphenyl)methane, bis-(4-hydroxyphenyl)-methane, bis(4-hydroxy-2,6-dimethyl-3-methoxyphenyl) methane, 1,1-bis-(4-hydroxyphenyl)ethane, 1,2-bis-(4-hydroxyphenyl)-ethane, 1,1-bis(4-hydroxy-2-chlorphenyl) ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)-propane, 2,2-bis-(4-hydroxyphenyl)pentane, 3,3-bis-(4-hydroxyphenyl)pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl) 1,1,1,3,3,3-hexafluoropropane and the like;

di(hydroxyphenyl)sulfones such as bis-(4-hydroxyphenyl, sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

di(hydroxyphenyl) ethers such as bis-(4-hydroxyphenyl) ether, the 4,3'-, 4,2'-, 2,2'-, 2,3'-, dihydroxydiphenyl ethers, 4,4'-dihydroxy-2,6-dimethyldiphenyl ether, bis-(4-hydroxy-3-isobutylphenyl) ether, bis-(4-hydroxy-3-isopropylphenyl) ether, bis-(4-hydroxy-3-chlorophenyl ether, bis-(4-hydroxy-3-fluophenyl) ether, bis-(4-hydroxy-3-bromophenyl) ether, bis-(4-hydroxynaphthyl) ether, bis-(4-hydroxy 3-chloronaphthyl) ether, 4,4'-dihydroxy-3,6-dimethoxydiphenyl ether, 4,4'-dihydroxy-2,5-diethoxydiphenyl ether, and the like materials.

Any dihalobenzenoid compound or mixture of dihalobenzenoid compounds can be employed in this invention which compound or compounds has the two halogens bonded to benzene rings having an electron withdrawing group in at least one of the positions ortho and para to the halogen group. The dihalobenzenoid compound can be either mononuclear where the halogens are attached to the same benzoid ring or polynuclear where they are attached to different benzenoid rings, as long as there is an activating electron withdrawing group in the ortho or para position of that benzenoid nucleus.

Any of the halogens may be the reactive halogen substituents on the benzenoid compounds. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. The water content should be maintained below about 1% and preferably below about 0.5% for best results.

Any electron withdrawing group can be employed as the activator group in these compounds. It should be, of course, inert to the reaction, but otherwise its structure is not critical. Preferred are the strong activating groups such as the sulfone group bonding two halogen substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen; however, the presence of other groups on the nucleus or in the residuum of the compound can be tolerated.

The activating group can be basically either of two types:

(a) monovalent groups that activate one or more halogens on the same ring as a nitro group, phenylsulfone, or alkylsulfone, cyano, trifluoromethyl, nitroso, and hetero nitrogen as in pyridine.

(b) divalent group which can activate displacement of halogens on two different rings, such as the sulfone group, the carbonyl group, as in bis(4-fluorophenyl) ketone; the vinylene group (—CH=CH—); the sulfoxide group; the azo-group (—N=N—); the saturated fluorocarbon groups (—CF2CF2—); organic phosphine oxides

where R is a hydrocarbon group, as in bis(4-fluorophenyl) phenyl phosphine oxide; and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds.

The use of phenol as an endcapping agent is acceptable, but it is difficult to maintain in the polymerization mixture since phenol (mp 40°–42° C., bp 182° C.) will sublime and then azeotrope with the water and azeotroping agent. A preferred endcapping agent employed is 4-phenylphenol, which is commercially available (mp 165° C., bp 321° C.). Other suitable endcapping agents include α-naphthol, β-naphthol, 4-phenylazophenol, 1-phenylazo-2-naphthol, 4-(benzyloxy)phenol, 4-methoxyphenol, 4-ethoxyphenol, 4-phenoxyphenol, 4-hydroxydiphenylsulfone, 2-hydroxyfluorene, 9-hydroxyfluorene, 9-hydroxyanthracene, 1-hydroxyadamantane, 2-hydroxyadamantane, 9-hydroxyphenanthrene, isomers (2-, 3- 4-) of hydroxybenzophenone, 1-hydroxyanthracene, 1-hydroxy-9H-fluoren-9-ylidene, dihydroanthracenol, 5-hydroxy- 1H-phenalene, 1,1':3,1"-terphenyl-2'-ol, 6,7,13,14-tetradehydro-5,9,10,11-tetrahydro-dibenzo(a,f)cyclodecen-5-ol and the like.

Endcapping the poly(arylene ether) with an unsubstituted phenolic-based endcapping agent improves the general appearance of the thermoplastic polymer after melt consolidation under equivalent heat and pressure as compared to the analogous non-endcapped homopolymers. More specifically, the consolidated specimen prepared from endcapped polymer has no dark occlusions which are observed in the homopolymer. These occlusions act as absorptive surfaces in the consolidated specimen and ultimately decrease the value of the luminous transmittance, the ratio of transmitted to incident light, of the polymer specimen.

The following examples illustrate the invention:

EXAMPLE I

Preparation of α-(1,4-Biphenylyl)-ω-(4-((4-(4-phenylphenoxy) -phenyl)-phenylphosphinyl) phenoxy)-poly(oxy-1,4-phenylene (phenylphosphinylidene)-1,4-phenyleneoxy-1,4-phenylene(2,2,2-trifluoro -1-(trifluoromethyl) ethylidene)-1,4-phenylene) (6FETPP-E)

To a 1000 mL round-bottom flask were added 2,2-bis(p-hydroxyphenyl)- 1,1,1,3,3,3-hexafluoropropane(0.161 mol), bis(4-fluorophenyl)phenyl phosphine oxide(0.163 mol), 4-phenylphenol (0.002 mol), potassium carbonate (0.386 mol), dry DMAc (500 mL) and toluene (150 mL). The water/toluene was azeotroped from the mixture into a Dean-Stark trap under a nitrogen atmosphere until 2.5 mL of water was removed. The solution was heated by oil bath at 160° C. under a nitrogen atmosphere for a period of 16–19 hours and cooled to room temperature. After cooling, the viscous white mixture was precipitated into a solution of 10% acetic acid/90% water (3000 mL) and chopped in a blender. Multiple precipitations from tetrahydrofuran (THF) into methanol were done until the polymer was not sticky. The polymer was isolated by a final wash in boiling methanol, filtration and drying in a 180° C. oven overnight to afford a white fibrous material (81.0 g, 82%). A solvent cast film of the dried polymer in anhydrous chloroform yielded a tough, colorless, transparent film with no haze.

Analytical: $\eta_{inh}$ (0.2 g/dL, 1,1,2,2-tetrachloroethane, 30±0.1° C.)=1.01 dL/g.

EXAMPLE II

The following reagents were quantitatively transferred into a 5000 mL four-necked roundbottom flask fitted with a mechanical stirrer, nitrogen inlet, Dean-Stark trap, and thermometer with 1225 mL of DMAc: 2,2-bis(p-hydroxyphenyl) 1,1,1,3,3,3-hexafluoropropane (0.901 mol), bis(4-fluoro-phenyl)phenyl phosphine oxide (0.910 mol), and 4-phenylphenol (0.009 mol). The solution was stirred under a nitrogen atmosphere at room temperature for 1 hour before the addition of potassium carbonate (2.15 mol), toluene (800 mL) and the remaining DMAc (1.25L). The water/toluene mixture was azeotroped from the mixture until 14 mL of water was removed. The solution was then heated by oil bath to a temperature of 156°–157° C. for 16–19 hours to yield an off-white slightly viscous solution which was then cooled to room temperature. The polymer was isolated by an initial precipitation into 10% acetic acid/90% water (12L), washed with sufficient quantities of water and methanol, chopped in a blender, and filtered. The polymer was reprecipitated by dissolving into THF (4L) , bringing the solution to theta conditions with methanol (4L), and the theta solution was then poured into 80% water/20% methanol (30L) and chopped in a blender. After drying in an oven overnight at 180° C., a white fibrous polymer of 6FETPP-E was afforded (518 g, 94%).

EXAMPLE III

In a procedure and apparatus similar to that described in Example II, 6FETPP-E was prepared to a theoretical molecular weight of 60,742 g/mol with these exceptions to the procedure: precipitations were accomplished using a lightning stirrer and the polymer was poured into water. The white fibrous polymer was afforded in 92% yield (511 g).

Analytical: $\eta_{inh}$ (0.2 g/dL, 1,1,2,2-tetrachloroethane, 30±0.1° C.)=0.65 dL/g.

EXAMPLE IV

In a repeat of the procedure described in Example III, 6FETPP-E was prepared to a theoretical molecular weight of 60,742 g/mol in a yield of 95% (528 g).

Analytical: $\eta_{inh}$ (0.2 g/dL, 1,1,2,2-tetrachloroethane, 30±0.1° C.)=0.63 dL/g.

EXAMPLE V

Preparation of .alpha.-(1,4-Biphenylyl)-.omega.-(4-((4-(4-phenylphenoxy)-phenyl) phenylphosphinyl) phenoxy) -poly(oxy(1,1'-biphenyl) -4,4'-diyloxy-1, 4-phenylene (phenylphosphinylidene)-1,4-phenylene) (BPETPP-E)

In a procedure and apparatus similar to that described in Example II, the polymer was prepared to a theoretical molecular weight of 45,814 g/mol with the following reagents: 4,4'-biphenol (0.901 mol), bis(4-fluorophenyl)-phenyl phosphine oxide (0.910 mol), 4-phenylphenol (0.009 mol), potassium carbonate (2.15 mol), DMAc (2500 mL) and toluene (750 mL). The following exception to Example II was practiced: multiple precipitations from a theta solution of chloroform/methanol into excess methanol were employed after the initial precipitation into 10% acetic acid/90% water. A white fibrous polymer was afforded (372 g, 89%).

Analytical: $\eta_{inh}$ (0.2 g/dL, 1,1,2,2-tetrachloroethane, 30±0.1° C.)=0.92 dL/g.

EXAMPLE VI

In a repeat of the procedure described in Example V, BPETPP-E was prepared as a white beaded powder (394.5 g, 94%). A solvent cast film prepared from the combined polymer of Examples V and VI and anhydrous chloroform yielded a tough, colorless film with slight haze.

Analytical: $\eta_{inh}$ (0.2 g/dL, 1,1,2,2-tetrachloroethane, 30±0.1° C.)=0.97 dL/g.

EXAMPLE VII

Preparation of .alpha.-(1,4-Biphenylyl)-.omega.-(4-((4-(4-phenylphenoxy)-phenyl) carbonyl) phenoxy) -poly(oxy-1,4-phenylenecarbonyl-1,4-phenyleneoxy -1,4-phenylene-9H-fluoren-9-ylidene-1,4phenylene) (FEK-E)

In a procedure and apparatus previously described in Example II, the polymer was prepared to a theoretical molecular weight of 52,063 g/mol using the following reagents: 9,9-bis(4-hydroxyphenyl)fluorene (0.985 mol), bis (4-fluorophenyl)ketone (0.995 mol), 4-phenylphenol (0.010 mol), potassium carbonate (2.38 mol), DMAc (2300 mL), and toluene (675 mL). The polymer was isolated by the procedure cited in Example 1 to give a fibrous white polymer (520 g, 99%).

EXAMPLE VIII

Preparation of α(1,4-Biphenylyl)-ω-(4-((4-(4-phenylphenoxy) phenyl)-phenylphosphinyl) phenoxy)-poly(oxy-1,4-phenylene (phenylphosphinylidene)-1,4-phenyleneoxy-1,4-phenylene-9H-fluoren-9-ylidene-1,4-phenylene) (FETPP-E):

In a procedure and apparatus previously described in Example II, the polymer was prepared to a theoretical molecular weight of 62,150 g/mol using the following reagents: 9,9-bis(4-hydroxyphenyl)fluorene (0.804 mol), bis (4-fluorophenyl)phenyl phosphine oxide (0.812 mol), 4-phenylphenol (0.008 mol), potassium carbonate (1.93 mol), DMAc (2300 mL), and toluene (675 mL). The polymer was isolated by the procedure cited in Example I to give a fibrous white polymer (489 g, 96%).

Analytical: $\eta_{inh}$ (0.2 g/dL, 1,1,2,2-tetrachloroethane, 30±0.1° C.)=0.64 dL/g.

EXAMPLE IX

In a repeat of the procedure described in Example VIII, FETPP-E was prepared as a white fibrous polymer (493 g, 97%).

EXAMPLE X

Preparation of an Endcapped Random Copolymer Consisting of 75% FEK and 25% poly(oxy-1,3-phenyleneoxy-1,4-phenylenecarbonyl-1,4-phenylene) (REK) (75 FEK/25 REK-E).

In a procedure and apparatus similar to that described in Example II, a copolymer of 75 FEK/25 REK-E was prepared to a theoretical molecular weight of 44,385 g/mol using the following reagents: resorcinol (0.040 mol), 9,9-bis(4-hydroxyphenyl)fluorene (0.121 mol), bis(4-fluorophenyl) ketone (0.163 mol), 4-phenylphenol (0.002 mol), potassium carbonate (0.386 mol), DMAc (500 mL), and toluene (150 mL). A fluffy off-white polymer was afforded (66 g, 85%). A film cast from anhydrous chloroform yielded a clear, tough, light brown film.

Analytical: $\eta_{inh}$ (0.2 g/dL, 1,1,2,2-tetrachloroethane, 30±0.1° C.)=0.87 dL/g.

Some of the basic physical properties of the encapped poly(arylene ether)s of this invention are compared below with the properties of the homopolymers known from the literature (Table I). The effect of the phenylphenoxy endcaps on the homopolymer glass transition temperature is minimal (approximately 5° C. for each comparison). In addition, there is no effect upon the optical clarity, color, or toughness of the homopolymer cast films by endcapping with 4-phenylphenol.

TABLE I

Comparison of Physical Properties of poly(Arylene ether) Homopolymers (-H) and Endcapped poly(Arylene ether) Homopolymers (-E).

| Composition | Molecular Formula | CAS Reg. Number | $Tg^{a,b,c}$ (°C.) | $M_w{}^d$, $M_n{}^e$ (g/mol) | Film Characteristics[f] |
|---|---|---|---|---|---|
| 6FETPP-H | $C_{33}H_{21}F_6O_6P$ | (162707-66-6) | N/A[g] | N/A[g] | N/A[g] |
| 6FETPP-E | $C_{75}H_{52}F_6O_6P_2$ | | 207[a] | 28,500[d] | clear, tough, colorless |
| BPETPP-H | $C_{30}H_{21}O_3P$ | (108809-07-0) | 236[b] | N/A[g] | N/A[g] |
| BPETPP-E | $C_{72}H_{52}O_6P_2$ | | 231[a] | 66,000[d] | clear, tough, colorless |
| FEK-H | $C_{38}H_{24}O_3$ | (41206-07-9) | 252[c] | 34,000[e] | clear, tough, flexible |
| FEK-E | $C_{75}H_{50}O_6$ | | 247[a] | N/A[g] | clear, tough, colorless |
| FETPP-H | $C_{43}H_{29}O_3P$ | (132139-82-3) | 284[b] | 35,000[d] | clear, tough |
| FETPP-E | $C_{85}H_{60}O_6P_2$ | | 281[a] | N/A[g] | clear, tough, colorless |

[a]Dynamic mechanical analysis, nitrogen, $\Delta T = 5°$ C./min.
[b]Differential scanning calorimetry, nitrogen, $\Delta T = 10°$ C./min. Values reported after rescan.
[c]Differential scanning calorimetry, nitrogen, $\Delta T = 20°$ C./min. Values reported after rescan.
[d]Gel permeation chromatography values (THF).
[e]Membrane osmometry values.
[f]Films cast from chloroform.
[g]Data not available at this time or not reported in literature.

Consolidated polymer specimens of this invention were prepared using the melt consolidation technique of compression molding with a Wabash 150 ton press and 2 tons ram pressure (Table II). Under similar conditions of consolidation, the PEPO homopolymers without endcaps exhibit small dark occlusions within the specimens which are not polished away and are uniformly dispersed throughout the polymer matrix.

TABLE II

Consolidation Data For poly(Arylene ether) Homopolymers (-H) and Homopolymers Endcapped With 0.5 mol % 4-Phenylphenol (-E). All Consolidations Using 2 Tons Ram Pressure.

| Composition | Consolidation Temperature, °C. (°F.) | Appearance After Consolidation |
|---|---|---|
| 6FETPP-H | 218 (425) | occluded |
| 6FETPP-E | 218 (425) | no occlusions |
| BPETPP-H | 316 (600) | occluded |
| BPETPP-E | 316 (600) | no occlusions |
| FEK-H | 316 (600) | occluded |
| FEK-E | 316 (600) | no occlusions |
| FETPP-H | 329 (625) | occluded |
| FETPP-E | 329 (625) | no occlusions |

The summary of the tensile mechanical and optical data for the endcapped homopolymers is included in Tables III and IV respectively.

TABLE III

Room Temperature Mechanical Data For poly(Arylene ether) Homopolymers Endcapped With 0.5 mol % 4-Phenylphenol (-E).

| Composition | Tensile Strength[a] (MPa, (Kpsi)) | Tensile Modulus[a] (MPa, (Kpsi)) | Strain-to-Failure[b] (%) | Specimen Form |
|---|---|---|---|---|
| 6FETPP-E | 69.8 (10.46) | 2328 (349) | 4.2 | microtensile dogbone |
| BPETPP-E | 69.9 (10.48) | 1748 (262) | 58.3 | microtensile dogbone |
| FEK-E | 84.7 (12.70) | 2461 (369) | 7.5 | microtensile dogbone |
| FETPP-E | 69.5 (10.41) | 2455 (368) | 4.0 | microtensile dogbone |

[a]ASTM D-638, 24° C.
[b]ASTM D-636, 24° C.

TABLE IV

Optical Properties For poly(Arylene ether) Homopolymers Endcapped With 0.5 mol % 4-Phenylphenol (-E).

| Polymer | Film Thickness (mils) | Yellowness Index (ASTM D-1925) | Luminous Transmittance (ASTM D-1003) | Haze (ASTM D-1003) | Refractive Index (ASTM D-542) |
|---------|---|---|---|---|---|
| 6FETPP-E | 6.0 | 3.5 | 89.5 | 6.4 | 1.597 |
| BPETPP-E | 4.0 | 3.5 | 87.3 | 16.8 | 1.706 |
| FEK-E | 8.4 | 5.7 | 85.4 | 13.5 | 1.683 |
| FETPP-E | 4.4 | 2.5 | 88.5 | 2.5 | 1.679 |

Various modifications may be made in the instant invention without departing from the spirit and scope of the appended claims.

We claim:

1. A method for increasing the transparency of poly(arylene ether) homopolymers and copolymers which comprises endcapping the polymeric chain with about 0.5–4 mol % 4-phenylphenol, based on the total dihydric phenolic moieties present.

2. The method of claim 1 wherein said poly(arylene ether) is a poly(arylene ether phosphine oxide).

3. The method of claim 2 wherein said polymer is the reaction product of 2,2-bis(p-hydroxyphenyl) 1,1,1,3,3,3-hexafluoropropane and bis(4-fluorophenyl)phenyl phosphine oxide.

4. The method of claim 2 wherein said polymer is the reaction product of 4,4'-biphenol and bis(4-fluorophenyl)phenyl phosphine oxide.

5. The method of claim 2 wherein said polymer is the reaction product of 9,9-bis(4-hydroxyphenyl)fluorene and bis(4-fluorophenyl)ketone.

6. The method of claim 2 wherein said polymer is the reaction product of 9,9-bis(4-hydroxyphenyl)fluorene and bis(4-fluorophenyl)phenyl phosphine oxide.

7. The method of claim 2 wherein said polymer is the reaction product of resorcinol, 9,9-bis(4-hydroxyphenyl)fluorene and bis(4-fluorophenyl)ketone.

* * * * *